United States Patent
Kongo

(10) Patent No.: US 10,019,813 B2
(45) Date of Patent: Jul. 10, 2018

(54) EMBROIDERY REGION DETECTION APPARATUS, EMBROIDERY REGION DETECTION METHOD, RECORDING MEDIUM FOR STORING PROGRAM, AND EMBROIDERY DESIGN LAYOUT SYSTEM

(71) Applicant: Janome Sewing Machine Co., Ltd., Tokyo (JP)

(72) Inventor: Takeshi Kongo, Tokyo (JP)

(73) Assignee: Janome Sewing Machine Co., Ltd., Tokyo (JP)

( * ) Notice: Subject to any disclaimer, the term of this patent is extended or adjusted under 35 U.S.C. 154(b) by 0 days.

(21) Appl. No.: 15/405,426

(22) Filed: Jan. 13, 2017

(65) Prior Publication Data
US 2017/0309037 A1 Oct. 26, 2017

(30) Foreign Application Priority Data
Apr. 26, 2016 (JP) ................ 2016-088483

(51) Int. Cl.
| | |
|---|---|
| *D05C 5/02* | (2006.01) |
| *G06T 7/70* | (2017.01) |
| *G06T 7/11* | (2017.01) |
| *D05B 19/12* | (2006.01) |
| *D05C 5/06* | (2006.01) |

(Continued)

(52) U.S. Cl.
CPC .............. *G06T 7/70* (2017.01); *D05B 19/12* (2013.01); *D05C 5/06* (2013.01); *D05C 13/02* (2013.01); *G06K 9/2063* (2013.01); *G06K 9/3208* (2013.01); *G06T 7/0004* (2013.01); *G06T 7/11* (2017.01); *G06T 2207/10004* (2013.01); *G06T 2207/30124* (2013.01)

(58) Field of Classification Search
CPC ........ D05B 19/08; D05B 19/10; D05B 19/12; D05C 5/06; D05C 13/00
USPC .................................................. 700/136–138
See application file for complete search history.

(56) References Cited

U.S. PATENT DOCUMENTS

| | | | | |
|---|---|---|---|---|
| 4,998,489 A | * | 3/1991 | Hisatake | D05B 19/08 112/103 |
| 7,155,302 B2 | * | 12/2006 | Muto | D05B 19/08 700/138 |

(Continued)

FOREIGN PATENT DOCUMENTS

| | | |
|---|---|---|
| JP | H08-155163 A | 6/1996 |
| JP | 2014-155580 A | 8/2014 |

*Primary Examiner* — Nathan Durham
(74) *Attorney, Agent, or Firm* — Nakanishi IP Associates, LLC

(57) ABSTRACT

Information with respect to an embroidery frame and information with respect to a mark alignment region are acquired. The mark alignment region is displayed for guiding multiple marks that are provided to an embroidery frame in order to define an embroidery region in the embroidery frame. When the multiple marks thus displayed are all positioned within the mark alignment region, an image of the embroidery region is acquired. Image analysis is performed based on the information with respect to the embroidery frame thus acquired and the information with respect to the multiple corresponding marks within the acquired image. Subsequently, the embroidery region within the embroidery frame is determined based on the analysis result. This allows the embroidery region to be detected with high precision in a simple manner.

10 Claims, 16 Drawing Sheets

(51) Int. Cl.
  *D05C 13/02*   (2006.01)
  *G06K 9/20*    (2006.01)
  *G06K 9/32*    (2006.01)
  *G06T 7/00*    (2017.01)

(56)               References Cited

U.S. PATENT DOCUMENTS

| | | | |
|---|---|---|---|
| 7,392,755 B2 * | 7/2008 | Kato | D05B 19/12 |
| | | | 112/102.5 |
| 8,539,892 B2 * | 9/2013 | Tokura | D05B 19/12 |
| | | | 112/102.5 |
| 8,738,173 B2 * | 5/2014 | Tokura | D05B 19/10 |
| | | | 700/138 |
| 8,763,541 B2 * | 7/2014 | Tokura | D05C 5/06 |
| | | | 112/102.5 |
| 8,869,721 B2 * | 10/2014 | Suzuki | D05B 19/12 |
| | | | 112/102.5 |
| 9,127,385 B2 * | 9/2015 | Suzuki | D05C 5/00 |
| 2014/0230707 A1 | 8/2014 | Suzuki et al. | |
| 2014/0230708 A1 * | 8/2014 | Suzuki | D05B 19/12 |
| | | | 112/102.5 |

* cited by examiner

EMBROIDERY REGION DETECTION APPARATUS, EMBROIDERY REGION DETECTION METHOD, RECORDING MEDIUM FOR STORING PROGRAM, AND EMBROIDERY DESIGN LAYOUT SYSTEM

CROSS REFERENCE TO RELATED APPLICATIONS

This application is based on and claims the benefit of priority to Japanese Patent Application No. 2016-088483 filed on Apr. 26, 2016, the contents of which are hereby incorporated by reference in their entirety.

BACKGROUND OF INVENTION

Field of the Invention

The present invention relates to an embroidery region detection apparatus, an embroidery region detection method, a recording medium for storing a program, and an embroidery design layout system.

Description of the Related Art

As a related technique, Patent document 1 discloses a sewing machine that is capable of laying out multiple designs such as text or the like selected by the user on an embroidery target cloth mounted on an embroidery frame, and of performing sewing so as to provide the embroidery designs at a uniform pitch within a specified sewing region.

Before the user performs embroidery by means of such a sewing machine, the user mounts, on the sewing machine, an embroidery frame mounting an embroidery target cloth, and performs a jog operation, which is a function of the sewing machine, so as to transfer the embroidery frame such that a needle position is set in the vicinity of the start position at which sewing is to be performed so as to provide an embroidery design. Next, the user executes a sewing region confirming function in which the embroidery frame is moved with respect to the needle along the sides of a rectangular region in which sewing is to be performed so as to provide embroidery. The user makes a visual judgement of whether or not position alignment has been obtained such that each embroidery design can be accommodated within the rectangular region.

RELATED ART DOCUMENTS

Patent Documents

Patent Document 1

Japanese Patent Application Laid-Open No. H08-155163

However, with the aforementioned technique, the embroidery frame includes an inner frame having a given height. Accordingly, such an arrangement is readily affected by natural light or illumination light. This leads to difficulty in positioning such an embroidery design with high precision. Furthermore, the inner frame of the embroidery frame is provided with resin protrusions that each function as a mark that indicates the embroidery region. However, the resin protrusions are designed assuming that the user will make use of them for visual judgement. Accordingly, in a case in which the embroidery region is detected based on an image by means of a camera or the like, it is difficult to make use of such marks.

SUMMARY OF INVENTION

Accordingly, it is a purpose of the one or more embodiments of the invention to provide an embroidery region detection apparatus, an embroidery region detection method, a recording medium for storing a program, and an embroidery design layout system, in order to detect an embroidery region with high precision in a simple manner.

Embodiment (1)

One or more embodiments of the invention provide an embroidery region detection apparatus. The embroidery region detection apparatus comprises: an embroidery frame information acquisition unit that acquires information with respect to an embroidery frame and information with respect to a mark alignment region to be displayed on a display unit for guiding multiple marks provided to the embroidery frame for defining an embroidery region within the embroidery frame; an image acquisition unit that acquires an image of the embroidery frame when the multiple marks displayed on the display unit are all positioned within the mark alignment region; an acquired image analyzing unit that performs image analysis based on the information with respect to the embroidery frame acquired by the embroidery frame information acquisition unit and corresponding information with respect to the multiple marks displayed in the image acquired by the image acquisition unit; and an embroidery region determination unit that determines the embroidery region within the embroidery frame based on an analysis result obtained by the acquired image analyzing unit.

Embodiment (2)

One or more embodiments of the invention provide the embroidery region detection apparatus. The embroidery region detection apparatus comprises a gravity direction detection unit that detects a gravity direction. The display unit displays an image acquisition orientation guidance display for guiding a position at which an image acquisition optical axis of the image acquisition unit aligns with the gravity direction based on a detection result obtained by the gravity direction detection unit.

Embodiment (3)

One or more embodiments of the invention provide the embroidery region detection apparatus. The embroidery region detection apparatus comprises an operation instructing unit that calls attention to inputting a positioning instruction for the embroidery frame such that the multiple marks displayed on the display unit are all positioned within the mark alignment region.

Embodiment (4)

One or more embodiments of the invention provide the embroidery region detection apparatus. With such an embodiment, the operation instructing unit provides at least one from among a guidance display and an audio guidance.

Embodiment (5)

One or more embodiments of the invention provide the embroidery region detection apparatus. With such an embodiment, when the multiple marks displayed on the display unit are all positioned within the mark alignment region and when judgment has been made based on the detection result obtained by the gravity direction detection unit that the image acquisition optical axis aligns with the gravity direction, the image acquisition unit automatically performs image acquisition.

Embodiment (6)

One or more embodiments of the invention provide the embroidery region detection apparatus. The embroidery region detection apparatus comprises a correction unit configured such that, when there is an inclination between the display unit and the embroidery region in the image acquired by the image acquisition unit, the inclination is corrected.

Embodiment (7)

One or more embodiments of the invention provide the embroidery region detection apparatus. With such an embodiment, the multiple marks are configured so as to differ in terms of at least one property from among color and shape according to the multiple embroidery regions to be defined in the embroidery frame.

Embodiment (8)

One or more embodiments of the invention provide the embroidery region detection apparatus. With such an embodiment, the acquired image analyzing unit performs thinning image processing on the image of the multiple marks thus acquired. The embroidery region determination unit determines the embroidery region based on the multiple marks thus subjected to the thinning image processing.

Embodiment (9)

One or more embodiments of the invention provide an embroidery region detection method employed by an embroidery region detection apparatus comprising an embroidery frame information acquisition unit, a display unit, an image acquisition unit, an acquired image analyzing unit, and an embroidery region determination unit. The embroidery region detection method comprises: acquiring, by the embroidery frame information acquisition unit, information with respect to an embroidery frame and information with respect to a mark alignment region displayed on a display unit for guiding multiple marks provided to the embroidery frame for defining an embroidery region within the embroidery frame; acquiring, by the image acquisition unit, an image of the embroidery frame when the multiple marks displayed on the display unit are all positioned within the mark alignment region; performing image analysis by the acquired image analyzing unit based on the information with respect to the embroidery frame acquired by the embroidery frame information acquisition unit and corresponding information with respect to the multiple marks displayed in the image acquired by the image acquisition unit; and determining, by the embroidery region determination unit, the embroidery region within the embroidery frame based on an analysis result obtained by the acquired image analyzing unit.

Embodiment (10)

One or more embodiments of the invention provide a recording medium for storing a program that instructs a computer to execute an embroidery region detection method employed in an embroidery region detection apparatus comprising an embroidery frame information acquisition unit, an image acquisition unit, a display unit, an acquired image analyzing unit, and an embroidery region determination unit. The embroidery region detection method comprises: acquiring, by the embroidery frame information acquisition unit, information with respect to an embroidery frame and information with respect to a mark alignment region displayed on a display unit for guiding multiple marks provided to the embroidery frame for defining an embroidery region within the embroidery frame; acquiring, by the image acquisition unit, an image of the embroidery frame when the multiple marks displayed on the display unit are all positioned within the mark alignment region; performing image analysis by the acquired image analyzing unit based on the information with respect to the embroidery frame acquired by the embroidery frame information acquisition unit and corresponding information with respect to the multiple marks displayed in the image acquired by the image acquisition unit; and determining, by the embroidery region determination unit, the embroidery region within the embroidery frame based on an analysis result obtained by the acquired image analyzing unit.

Embodiment (11)

One or more embodiments of the invention provide an embroidery design layout system comprising an embroidery region detection apparatus and a sewing machine. The embroidery region detection apparatus comprises: an embroidery frame information acquisition unit that acquires information with respect to an embroidery frame and information with respect to a mark alignment region to be displayed on a display unit for guiding multiple marks provided to the embroidery frame for defining an embroidery region within the embroidery frame; an image acquisition unit that acquires an image of the embroidery frame when the multiple marks displayed on the display unit are all positioned within the mark alignment region; an acquired image analyzing unit that performs image analysis based on the information with respect to the embroidery frame acquired by the embroidery frame information acquisition unit and corresponding information with respect to the multiple marks displayed in the image acquired by the image acquisition unit; an embroidery region determination unit that determines the embroidery region within the embroidery frame based on an analysis result obtained by the acquired image analyzing unit; an embroidery design information acquisition unit that acquires, from the sewing machine, information with respect to an embroidery design to be used for embroidery; a display control unit that instructs the display unit to display the embroidery design acquired by the embroidery design information acquisition unit and an image of the embroidery frame acquired by the image acquisition unit in a superimposed manner; an operating unit that receives an operating instruction from a user; an embroidery layout data editing unit that performs coordinate conversion based on a position and an orientation of the embroidery design with respect to the embroidery region within the embroidery frame according to the operating instruction input via the operating unit, so as to edit the embroidery layout data; and a transmission unit that transmits the embroidery layout data thus edited to the sewing machine. The sewing machine comprises: a reception unit that receives the embroidery layout data thus edited; and an embroidery executing unit that executes an embroidery operation for an embroidery target cloth mounted on the embroidery frame based on the embroidery layout data thus received.

With at least one from among the aforementioned embodiments according to the present invention, such an arrangement has an advantage of allowing the embroidery region to be detected with high precision in a simple manner.

DETAILED DESCRIPTION

Figure 1:
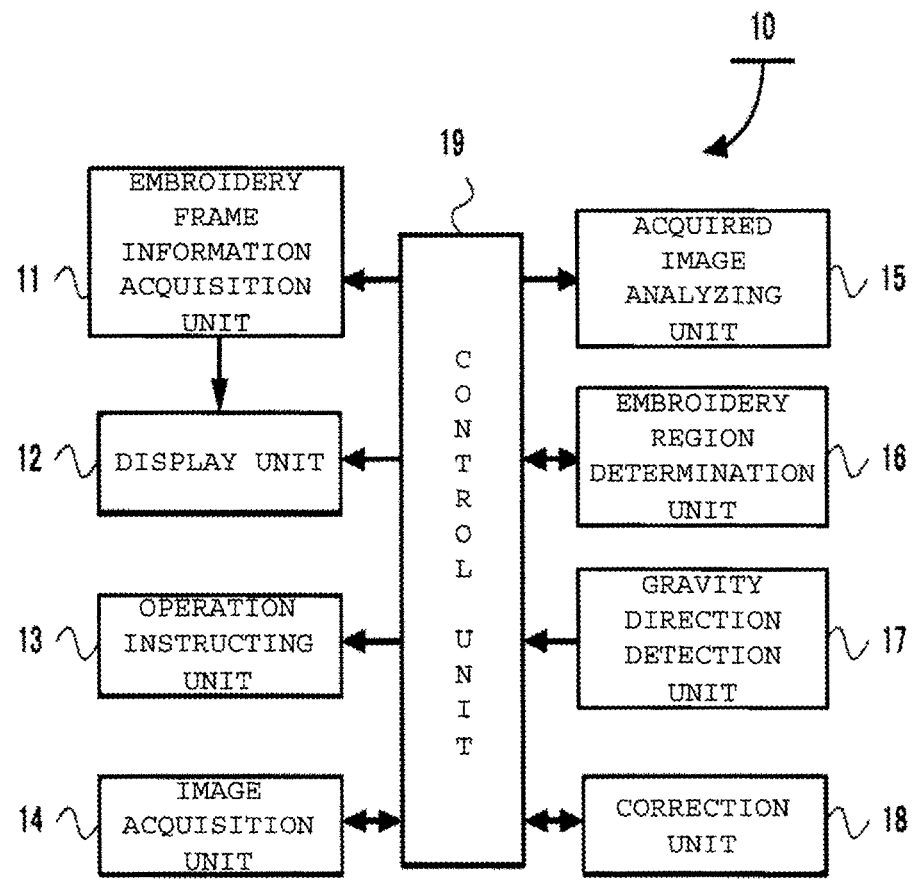
FIG. 1 is a diagram showing an electrical configuration of an embroidery region detection apparatus according to a first embodiment of the present invention.

Detailed description will be made regarding an embodiment of the present invention with reference to the drawings.

First Embodiment

Description will be made with reference to FIGS. 1 through 12 regarding an embroidery region detection apparatus according to a first embodiment.

The embroidery region detection apparatus according to the present embodiment employs an embroidery frame including marks defining an embroidery region which are located in a position that allows them to be identified visually when an embroidery target cloth is fixedly mounted, for example. When the user specifies the embroidery frame to be used, the embroidery region detection apparatus acquires mark alignment region information with respect to a region for guiding the marks. The embroidery region detection apparatus displays an image of the mark alignment region thus acquired for guiding the marks provided to the embroidery frame, an image of the embroidery frame including the marks, and an image of the embroidery target cloth mounted on the embroidery frame, in a superimposed manner. The embroidery region detection apparatus prompts the user to perform a positioning operation for the embroidery frame including the marks such that all the marks are each positioned within the corresponding mark alignment region. When all the marks are each positioned within the corresponding mark alignment region, the image displayed on the display unit is acquired. The embroidery region detection apparatus performs image analysis based on the information with respect to the embroidery frame thus acquired and the corresponding marks displayed in the image acquired by an image acquisition unit. Subsequently, the embroidery region detection apparatus determines the embroidery region based on the analysis result. Detailed description will be made below regarding such an arrangement.

[Configuration of the Embroidery Region Detection Apparatus]

Description will be made below with reference to FIG. 1 regarding a configuration of the embroidery region detection apparatus according to the present embodiment. It should be noted that description will be made below as an example regarding the embroidery region detection apparatus configured as a tablet terminal 10.

The tablet terminal 10 may be configured as a commercially available general-purpose tablet terminal. Before such a tablet terminal 10 is used as the embroidery region detection apparatus according to the present embodiment, a program for executing embroidery region detection (an application program) is installed on the tablet terminal 10. It should be noted that such an issue may be recorded on a recording medium such as a flash memory device or the like. Also, such an issue may be obtained by downloading via various kinds of known networks. It should be noted that description is being made in the present embodiment regarding such a tablet terminal 10 as a specific example of the embroidery region detection apparatus. However, the present invention is not restricted to such an arrangement. Also, a smartphone may be employed, for example. Alternatively, a camera or the like having a function required to function as the embroidery region detection apparatus may be employed, which is mounted on a sewing machine by means of a mechanism that allows it to be fixedly mounted at a position where it can acquire an image of the overall area of the embroidery frame.

As shown in FIG. 1, the tablet terminal 10 includes an embroidery frame information acquisition unit 11, a display unit 12, an operation instructing unit 13, an image acquisition unit 14, an acquired image analyzing unit 15, an embroidery region determination unit 16, a gravity direction detection unit 17, a correction unit 18, and a control unit 19.

Figure 3:
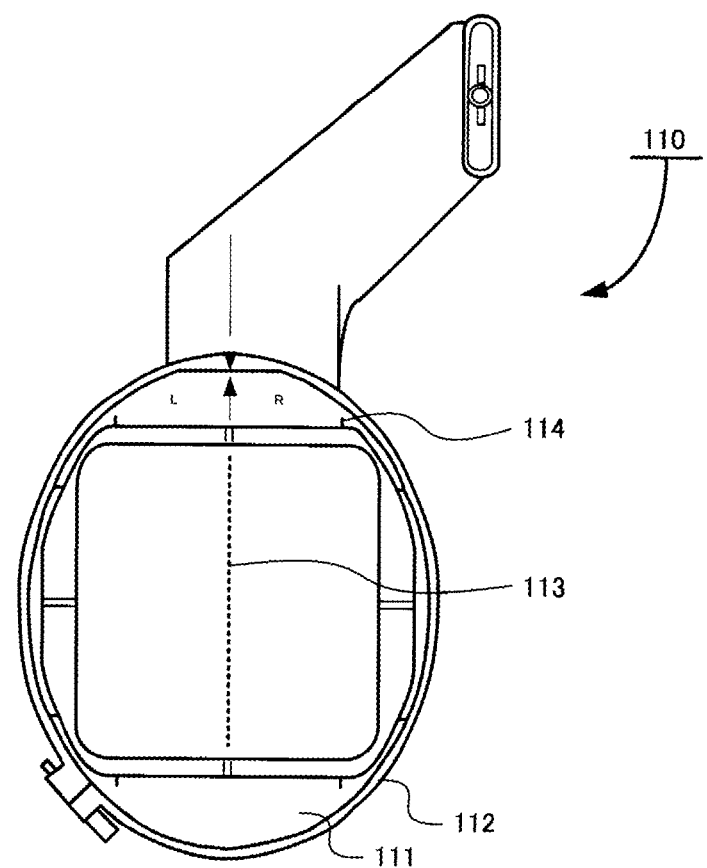
FIG. 3 is a diagram showing an example of an embroidery frame according to the first embodiment of the present invention.
Figure 12:
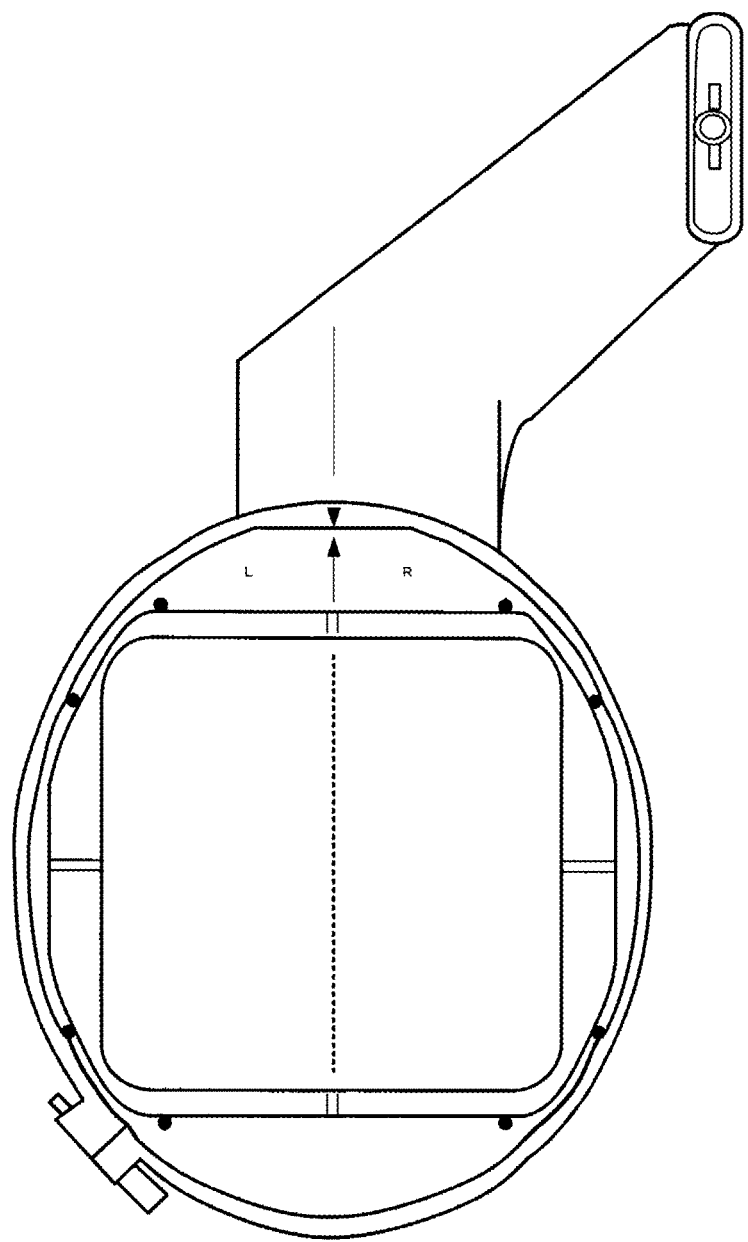
FIG. 12 is a diagram showing an example of a different kind of the embroidery frame according to the first embodiment of the present invention.

The embroidery frame information acquisition unit 11 acquires information with respect to the kind of the embroidery frame and the mark alignment region information with respect to a region for guiding the marks provided to the embroidery frame in a position that allows them to be visually identified for defining an embroidery region after an embroidery target cloth is fixedly mounted. As shown in FIG. 3, the embroidery frame 110 employed in the present embodiment is formed of an inner frame 111, an outer frame 112, and embroidery region marks 114. The embroidery region marks 114 are formed in the form of short lines that pass through the embroidery frame such that they are arranged on lines that extend along the four sides of the embroidery region having a rectangular shape. Furthermore, the embroidery region marks 114 are each formed as a mark in the form of a short straight line on the inner frame 111 of the embroidery frame 110. Description is being made in the embodiment regarding an arrangement including eight embroidery region marks 114 each formed as a mark in the form of a vertical line or otherwise a horizontal line on the inner frame 111. It should be noted that description is being made for exemplary purposes regarding the embroidery frame 110 comprising the inner frame 111 and the outer frame 112 formed as separate frames. Also, the embroidery frame 110 may have a hinge structure in which such a pair of frames includes a coupling portion such that, by turning one frame, the two frames overlap. Also, as shown in FIG. 12, each of the embroidery region marks 114 may be configured to differ in terms of at least one property from among the color and shape. As described above, by configuring the embroidery region marks 114 to have different colors or shapes, such an arrangement allows the image to be easily recognized. Description is being made in the present embodiment for exemplary purposes regarding an arrangement in which the embroidery region is configured to have a rectangular shape. Also, by providing additional embroidery region marks to the eight embroidery region marks 114 according to the present embodiment, such an arrangement is applicable to a case in which the embroidery region has other shapes such as a polygonal shape, circular shape, semi-circular shape, or the like. Also, in order to support various kinds of embroidery regions, other kinds of marks may be arranged according to the various kinds of embroidery regions. In this case, such marks may be designed to have a color or a shape that is defined according to the embroidery region. As described above, by providing the embroidery frame with such marks that support multiple embroidery regions, such an arrangement allows the kinds of the embroidery frames to be reduced to a minimum. Also, by configuring the marks to have different colors or shapes according multiple different embroidery ranges, such an arrangement allows the marks to be identified in a simple manner in the image processing operation.

The display unit 12 displays a superimposed image comprising images of the mark alignment region (shaded area in FIG. 5) for guiding the embroidery marks 114 of the embroidery frame 110 acquired by the embroidery frame information acquisition unit 11, the embroidery frame 110 including the embroidery region marks 114, and the embroidery target cloth mounted on the embroidery frame 110. Furthermore, the display unit 12 displays an image acquisition orientation guiding display for guiding the alignment between the image acquisition optical axis of the image acquisition unit 14 and the gravity direction based on the detection result obtained by the gravity direction detection unit 17 described later. In addition to a function for displaying such various kinds of images, the display unit 12 is configured including an unshown operating unit in order to function as a touch panel. In addition to displaying such information, the display unit 12 allows the user to input various kinds of operation instructions.

The operation instructing unit 13 prompts the user to perform a positioning operation for the embroidery frame 110 including the embroidery region marks 114 such that all the embroidery region marks 114 are each positioned within the corresponding mark alignment region. It should be noted that such an arrangement may provide a guidance display or otherwise audio guidance, etc., in order to prompt the user to perform the positioning operation. By providing such a guidance display or otherwise audio guidance, etc., such an arrangement allows the user to easily perform the positioning operation even if the user is inexperienced in the use of the tablet terminal 10.

When all the embroidery region marks 114 are each positioned within the corresponding mark alignment region, the image acquisition unit 14 acquires an image displayed on the display unit 12. It should be noted that, in actuality, the user performs image acquisition using the tablet terminal 10 held in the user's hands. Also, the image acquisition may be automatically performed when judgment has been made that the embroidery region marks 114 are each positioned within the corresponding mark alignment region and judgment has been made based on the detection result obtained by the gravity direction detection unit 17 described later that the image acquisition optical axis is aligned with the gravity direction. As described above, by automatically acquiring an image by means of image analysis, such an arrangement is capable of preventing degradation in image quality due to camera shake or the like, thereby providing high-precision image acquisition.

The acquired image analyzing unit 15 performs image analysis based on the information with respect to the embroidery frame 110 acquired by the embroidery frame information acquisition unit 11 and the corresponding embroidery region marks 114 in the image acquired by the image acquisition unit 14. Specifically, the acquired image analyzing unit 15 performs thinning image processing on the acquired image of the embroidery region marks 114. This allows the embroidery region to be identified.

The embroidery region determination unit 16 determines the embroidery region based on the analysis result obtained by the acquired image analyzing unit 15. The gravity direction detection unit 17 detects the gravity direction with respect to the tablet terminal 10, so as to detect the inclination of the horizontal axis of the tablet terminal 10. The user is able to monitor, via the acquired image orientation guidance display, the detection result obtained by the gravity direction detection unit 17. Also, the gravity direction detection unit 17 may be configured as a level sensor, a geomagnetic sensor, or the like. By providing the gravity direction detection unit 17, such an arrangement allows the user to easily hold the tablet terminal 10 in a horizontal state. When the embroidery region in the image acquired by the image acquisition unit 14 is inclined with respect to the display unit 12, the correction unit 18 performs correction for the inclination. By performing such correction, such an arrangement is capable of providing embroidery with high-precision positioning in the embroidery region.

The control unit 19 controls the overall operation of the embroidery region detection apparatus according to a control program. Furthermore, the tablet terminal 10 includes an unshown storage unit configured as ROM (Read Only Memory), RAM (Random Access Memory), flash memory, or the like, and stores various kinds of data such as image data acquired by the image acquisition unit 14 and the like. It should be noted that examples of such data stored in the storage unit include the embroidery frame information, embroidery frame image, mark alignment region image, gravity direction determination image, operation guidance program, audio data, display data, and the like.

[Operation of the Embroidery Region Detection Apparatus]

Description will be made with reference to FIGS. 2 through 11 regarding the operation of the embroidery region detection apparatus according to the present embodiment.

Figure 2:
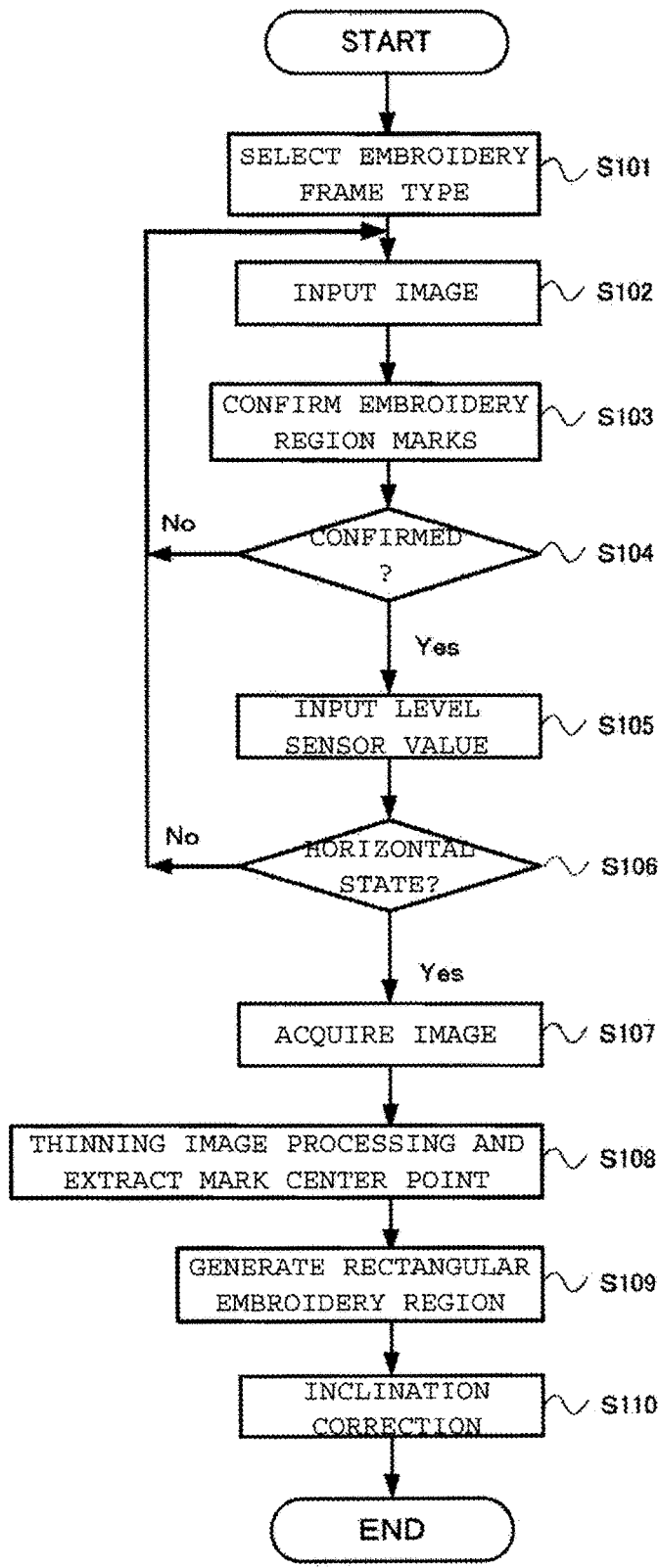
FIG. 2 is a diagram showing an electrical operation of the embroidery region detection apparatus according to the first embodiment of the present invention.

First, as a preparation step, the user mounts a cloth on the embroidery frame 110, and places the embroidery frame 110 in a horizontal position. As shown in FIG. 2, after the user starts up the application installed on the tablet terminal 10, the user opens a frame type selection menu. In this stage, the display unit 12 of the tablet terminal 10 displays a frame type list for the embroidery frame 110 as shown in FIG. 4 (Step S101).

Figure 4:
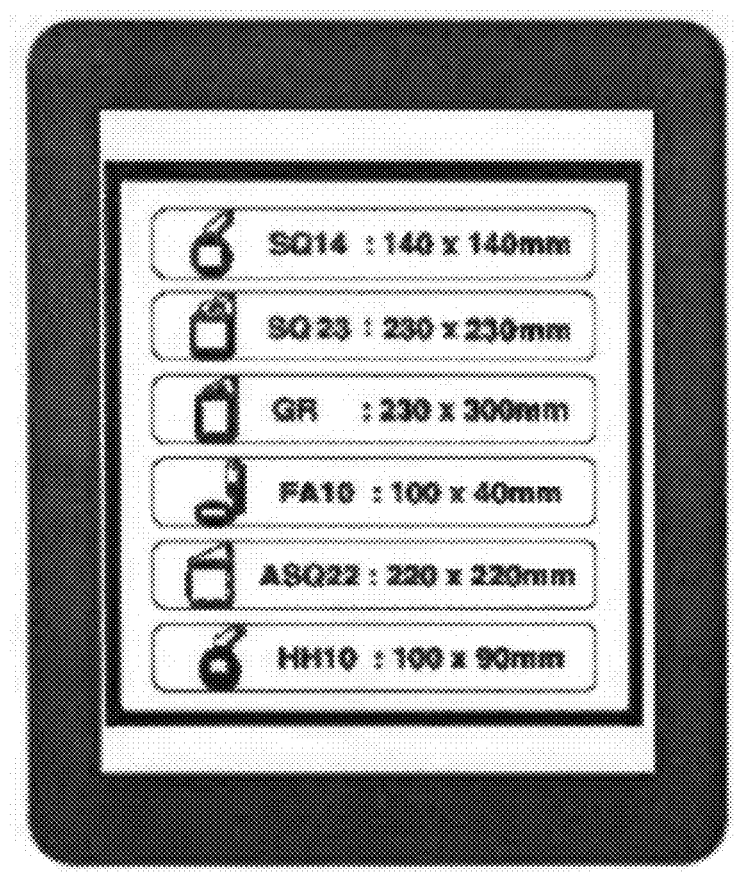
FIG. 4 is an example of a state according to the first embodiment of the present invention in which multiple embroidery frames are displayed on a display screen of the embroidery region detection apparatus in order to enable selection of the embroidery frame.
Figure 5:
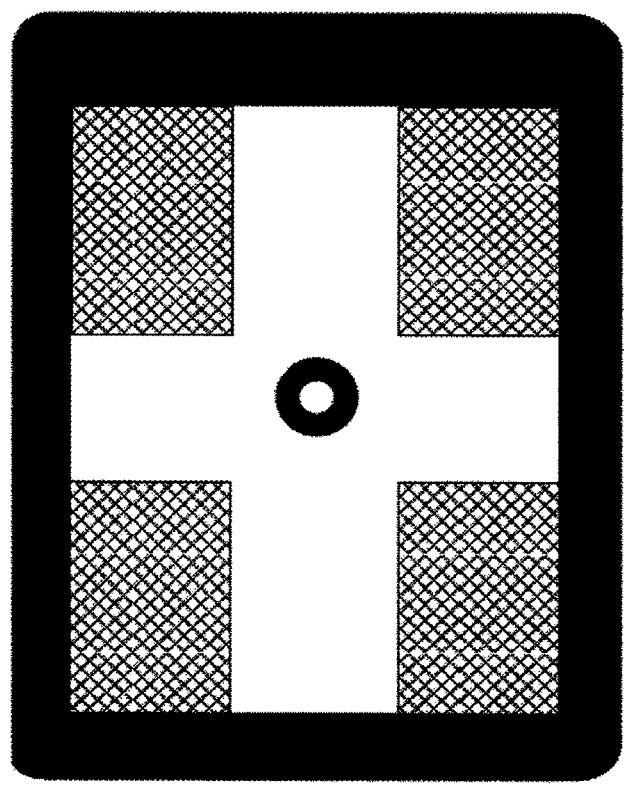
FIG. 5 is an image of a mark alignment region for guiding embroidery marks of the embroidery frame according to the first embodiment of the present invention.
Figure 6:
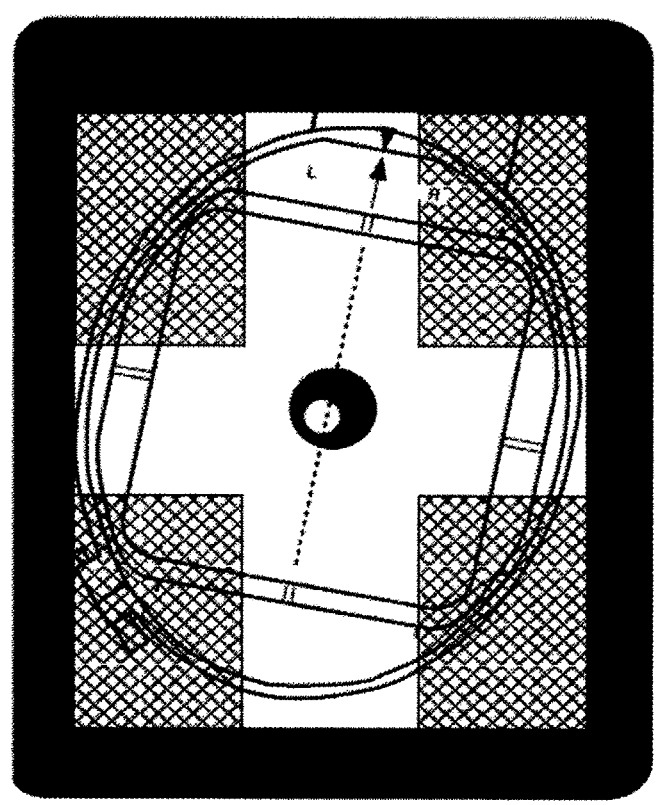
FIG. 6 is a diagram showing an example of a state according to the first embodiment of the present invention in which position alignment is performed such that the embroidery region marks are positioned within the alignment region displayed on a display screen of the embroidery region detection apparatus.
Figure 7:
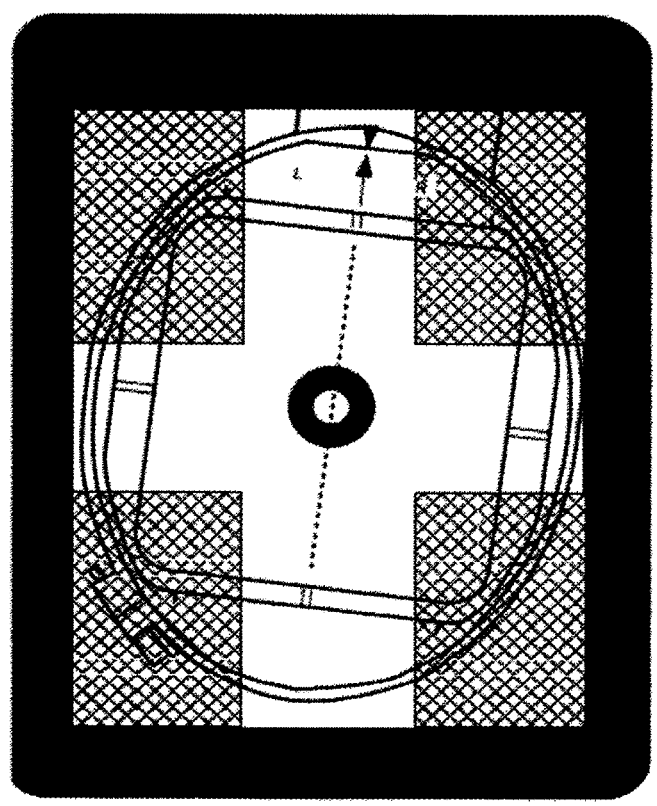
FIG. 7 is a diagram showing an example of a state according to the first embodiment of the present invention in which position alignment is performed such that the embroidery region marks are positioned within the alignment region displayed on a display screen of the embroidery region detection apparatus.

The user selects the same frame type as that of the embroidery frame 110 mounting the cloth from the list shown in FIG. 4. In this stage, the image acquisition unit 14 starts up, and the display unit 12 of the tablet terminal 10 displays a screen as shown in FIG. 5. Furthermore, the display unit 12 displays a real-time image as a superimposed image (Step S102). FIG. 5 shows an image including: an image of the image acquisition alignment regions positioned on four corners thereof for the embroidery region marks determined beforehand according to the embroidery frame type; and an image of a level indicator on the central portion thereof that indicates the degree of horizontality of the tablet terminal 10. When the inner circle shown as a white circle is aligned with the center of the outer circle after the user adjusts the level of the tablet 10, this indicates that the tablet terminal 10 has come to be in a horizontal state. The user adjusts the position of the tablet such that the eight embroidery region marks 114 are all positioned within the image acquisition alignment regions for the embroidery region marks, and such that the inner circle shown as a white circle configured as a level indicator is aligned with the center of the outer circle. It should be noted that an image input in a real-time manner may be analyzed so as to automatically detect whether or not the embroidery region marks 114 are each positioned in a corresponding narrow region (shaded region in FIGS. 6 and 7) defined beforehand according to the kind of the embroidery frame 110. Such an arrangement may notify the user of the detection result by means of a buzzer or the like.

The user holds the tablet terminal 10 such that the image acquisition unit 14 faces the embroidery frame 110 over which the cloth has been stretched. Judgement is made, by means of image processing, regarding whether or not all the eight embroidery region marks 114 are each positioned within the corresponding one of the embroidery region mark alignment regions provided to the four corners of the display unit 12 of the tablet terminal 10 (Step S103). When judgement has been made that the embroidery region marks 114 are not each positioned within the corresponding embroidery region mark alignment region ("NO" in Step S104), the flow returns to Step S102, and image acquisition is performed again.

When judgement has been made that each embroidery region mark 114 is positioned within the corresponding embroidery region mark alignment region ("YES" in Step S104), the flow proceeds to Step S105 in which the sensor value of the level sensor is read out and judgment is made whether or not the tablet terminal 10 is in a horizontal state (Step S106). When judgment has been made that the tablet terminal 10 is not in a horizontal state ("NO" in Step S106), the flow returns to Step S102, and the image acquisition is performed again. When judgment has been made that the tablet terminal 10 is in a horizontal state ("YES" in Step S106), judgement is made that the image acquisition condition has been satisfied. In this case, the flow proceeds to Step S107 in which the image displayed in this stage is acquired and stored in the memory as the image data.

Figure 8:
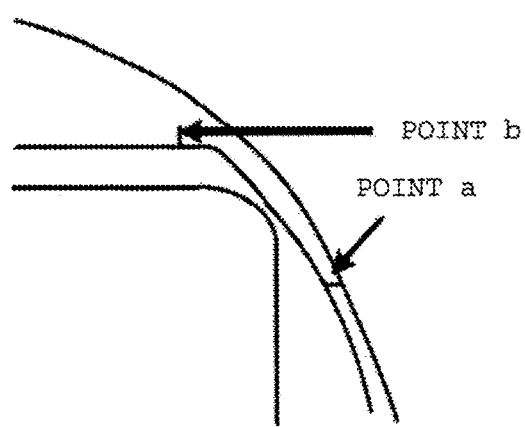
FIG. 8 is a diagram showing an example of a state according to the first embodiment of the present invention in which thinning image processing is performed on the marks provided to the embroidery frame.
Figure 9:
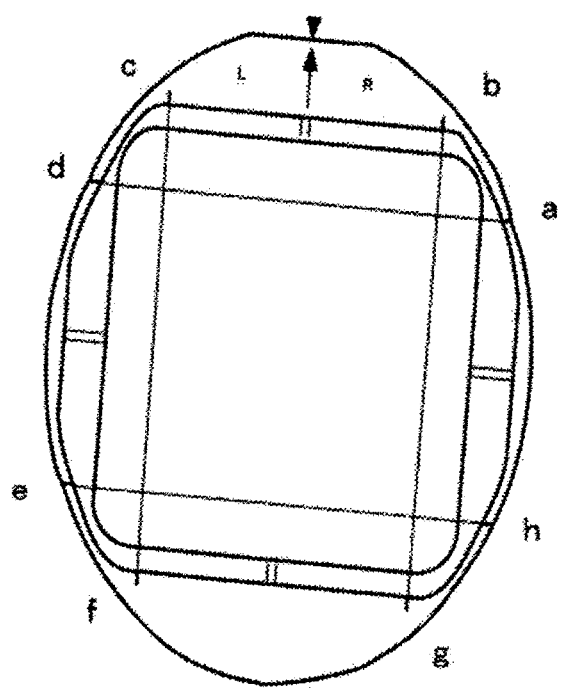
FIG. 9 is a diagram showing an example of a state according to the first embodiment of the present invention in which a line is defined between each pair of opposing marks provided to the embroidery frame.

The embroidery region marks 114 printed on the inner frame 111 of the embroidery frame 110 have a given thickness and a given length. Accordingly, as shown in FIG. 8, thinning image processing is performed (Step S118). Subsequently, the coordinate position of an intermediate point is acquired for each of the eight lines. Furthermore, as shown in FIG. 9, lines are defined such that they pass through a pair of opposing intermediate points. That is to say, such lines are defined based on the coordinate positions of the points a through h.

Four equations are derived based on the coordinate positions of the points a through h, such that they represent the four lines, i.e., the line a-d, the line h-e, the line b-g, and the line c-f. Next, the equations are solved so as to calculate the intersection for each pair of lines that are orthogonal to each other, i.e., the intersections between the line a-d and the line b-g, between the line a-d and the line c-f, between the line c-f and the line h-e, and between the line h-e and the line b-g. With the intersection between the line a-d and the line b-g as k, with the intersection between the line a-d and the line c-f as l, with the intersection between the line c-f and the line h-e as m, and with the intersection between the line h-e and the line b-g as n, lines are defined such that they pass through the intersections as shown in FIG. 10, thereby defining the embroidery region having a rectangular shape (Step S109).

Figure 10:
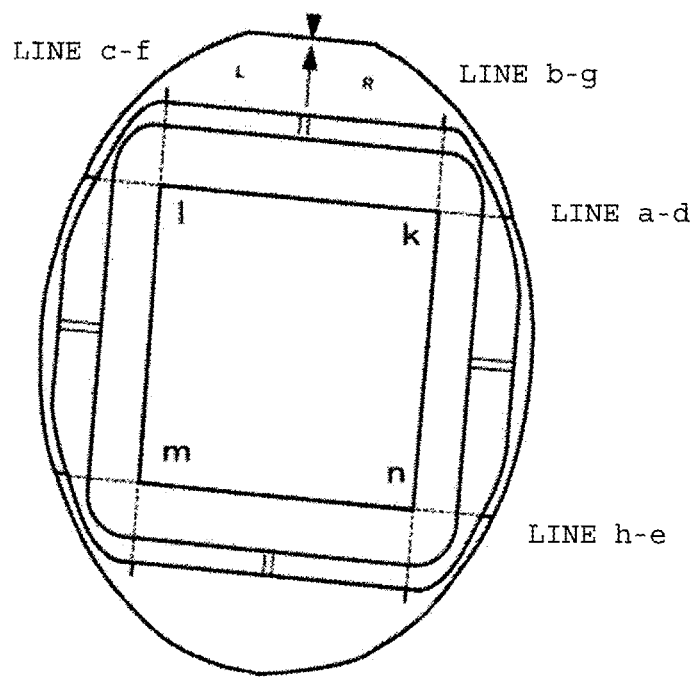
FIG. 10 is a diagram showing an example of a state according to the first embodiment of the present invention in which a line is defined between each pair of opposing marks, so as to determine a rectangular embroidery region.
Figure 11:
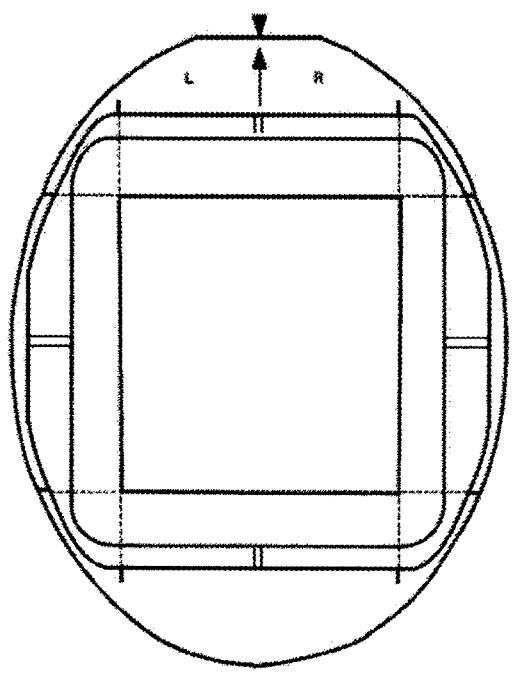
FIG. 11 is a diagram showing an inclination correction according to the first embodiment of the present invention performed after the rectangular embroidery region is determined.

FIG. 10 shows an example case in which the tablet terminal 10 is held by the user in an inclined manner. Accordingly, the acquired image has a corresponding inclination, leading to the image of the embroidery region having the same inclination. In order to address such an issue, the inclination is corrected, i.e., rotation correction is performed such that the acquired image is aligned with the center axis of the tablet terminal, thereby providing the screen display as shown in FIG. 11 (Step S110).

[Effects of the Present Embodiment]

As described above, with the present embodiment, the embroidery region marks 114 are provided to the inner frame 111 of the embroidery frame 110 such that they are printed in a high-contrast color or otherwise are configured in a form that enables easy visual confirmation. Thus, such an arrangement allows the embroidery region marks 114 to be easily recognized in the image data acquired from the displayed image. Furthermore, with the image acquisition method, such an image must be acquired such that each embroidery region mark 114 is positioned in the corresponding narrow region in the image defined beforehand according to the kind of the embroidery frame 110. This unambiguously defines the image acquisition orientation and direction. Thus, there is no need to perform image processing or image recognition for unnecessary regions, thereby allowing the operation to have a simple configuration. Moreover, when the embroidery region marks 114 are positioned within the predetermined regions in the image and when the level sensor indicates that the tablet terminal is in a horizontal state, the camera shutter is automatically operated. This allows the user to concentrate on holding the tablet terminal in a stable state. In addition, such an arrangement is capable of automatically acquiring the embroidery region based on a total of eight embroidery region marks 114 distributed for the four corners. Such an arrangement is capable of providing high-precision correction even if the acquired image is inclined. Furthermore, the actual embroidery region is represented by known values. This allows the image magnification factor to be derived. With such an arrangement, the positioning operation for an embroidery design drawn on the screen is reflected in the control operation of the actual embroidery frame.

Second Embodiment

Description will be made with reference to FIGS. 13 through 16 regarding an embroidery design layout system according to a second embodiment.

The embroidery design layout system according to the present embodiment is configured as a system that allows a sewing machine to provide desired embroidery in an embroidery region with high precision using a function of the embroidery region detection apparatus according to the first embodiment. Detailed description thereof will be made below.

[Configuration of the Embroidery Design Layout System]

Figure 13:
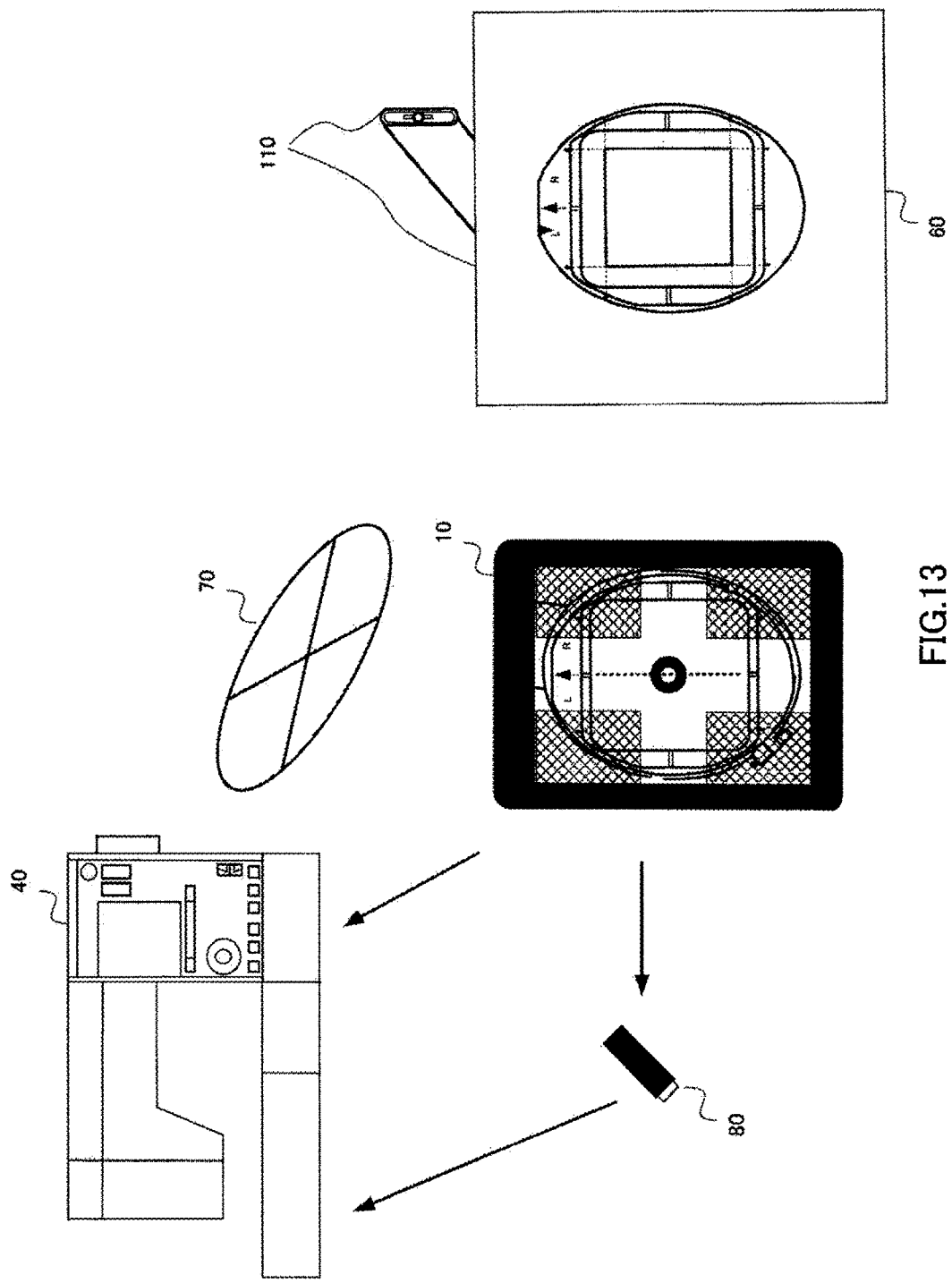
FIG. 13 is a diagram showing a schematic configuration of an embroidery design layout system according to a second embodiment of the present invention.

As shown in FIG. 13, the embroidery design layout system according to the present embodiment comprises a sewing machine 40 and a tablet terminal 10 having a function as the embroidery region detection apparatus. The sewing machine 40 and the tablet terminal 10 are connected to each other via a network such as a wireless LAN 70 or the like. It should be noted that the present embodiment is not restricted to such an arrangement employing such a network such as the wireless LAN 70 or the like. For example, a communication system may be employed using Bluetooth (trademark). Also, an off-line communication system may be employed using USB memory 80 or the like, for example.

[Configuration of the Tablet Terminal]

Figure 14:
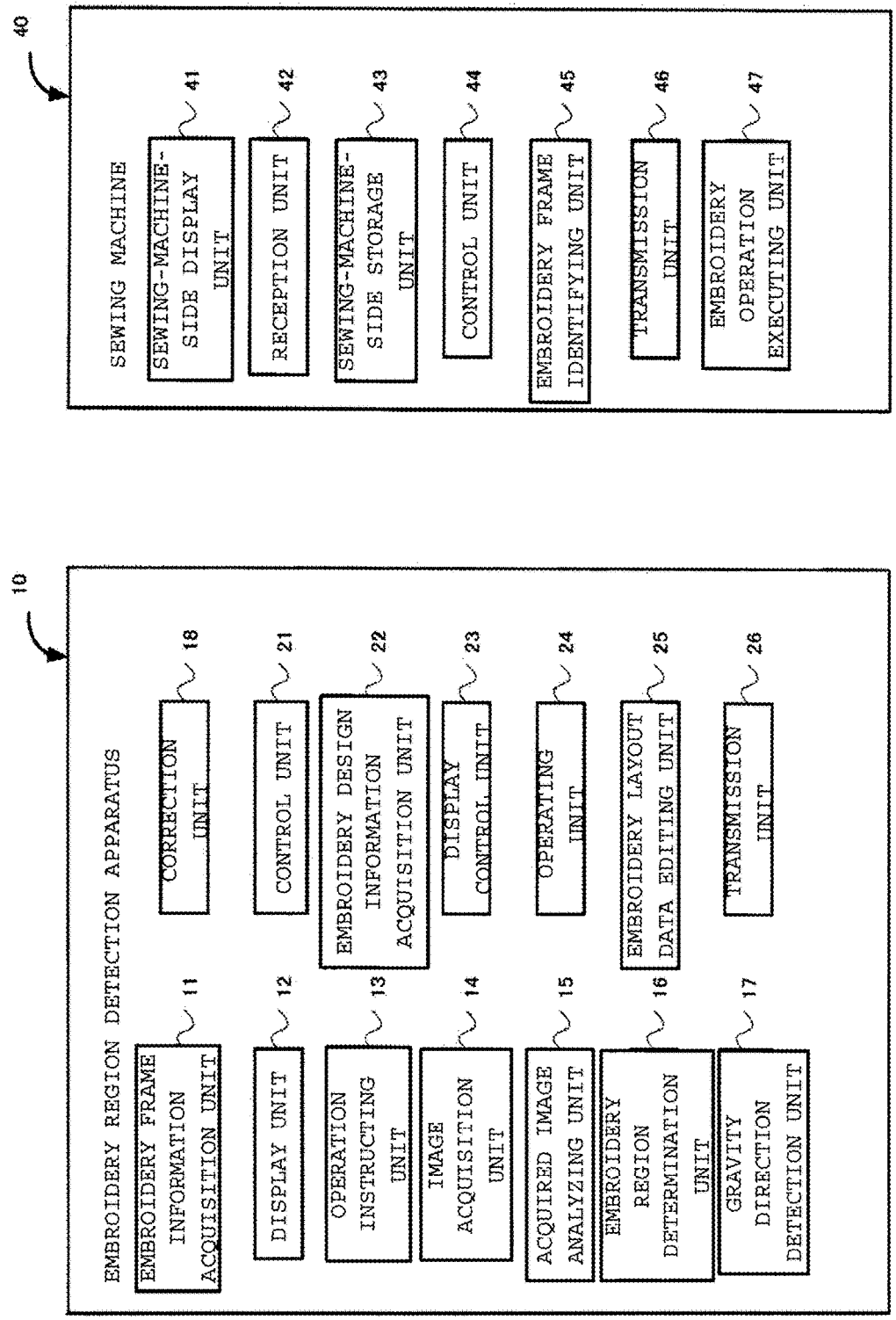
FIG. 14 is an electrical configuration of the embroidery design layout system according to the second embodiment of the present invention.

As shown in FIG. 14, the tablet terminal 10 according to the present embodiment includes an embroidery frame information acquisition unit 11, a display unit 12, an operation instructing unit 13, an image acquisition unit 14, an acquired image analyzing unit 15, an embroidery region determination unit 16, a gravity direction detection unit 17, a correction unit 18, a control unit 21, an embroidery design information acquisition unit 22, a display control unit 23, an operating unit 24, an embroidery layout data editing unit 25, and a transmission unit 26. It should be noted the components denoted by the same reference numerals as those in the first embodiment have the same functions. Accordingly, detailed description thereof will be omitted.

The control unit 21 performs a display control operation for the display unit 12 via the display control unit 23 described later, a control operation based on the information received from the operating unit 24, and a control operation for the data editing operation of the embroidery layout data editing unit 25.

The embroidery design information acquisition unit 22 acquires the information from the sewing machine 40 with respect to the design to be used in the embroidery. The display control unit 23 instructs the display unit 12 to display the embroidery design acquired by the embroidery design information acquisition unit 22, at least a part of the image acquired by the image acquisition unit 14, and the embroidery region, with the same scale in a superimposed manner, based on the analysis result obtained by the acquired image analyzing unit 15 and the embroidery region determined by the embroidery region determination unit 16.

The operating unit 14 receives an operation instruction from the user. The embroidery layout data editing unit 25 performs coordinate conversion based on the position and the orientation of the embroidery design with respect to the embroidery frame 110 according to the instruction input via the operating unit 24, so as to edit the embroidery layout data. The transmission unit 26 transmits the edited embroidery layout data to the sewing machine 40.

[Configuration of the Sewing Machine]

As shown in FIG. 14, the sewing machine 40 according to the present embodiment comprises a sewing-machine-side display unit 41, a reception unit 42, a sewing-machine-side storage unit 43, a control unit 44, an embroidery frame identifying unit 45, a transmission unit 46, and an embroidery operation executing unit 47. Here, the sewing machine 40 provides semi-automatic embroidery using multiple threads having different colors according to the embroidery data, for example. In addition, the sewing machine 40 is configured as a multi-function sewing machine that supports ordinary sewing according to various kinds of sewing patterns.

The sewing-machine-side display unit 41 is provided to the sewing machine 40 itself. For example, the sewing machine-side-display unit 41 is configured as a liquid crystal display apparatus. The sewing-machine-side display unit 41 displays various kinds of information useful for the user according to the sewing machine operating state. For example, in a threading operation, the sewing-machine-side display unit 41 displays content for assisting the user to perform the threading operation. The sewing machine 40 is configured as a multi-function sewing machine. Accordingly, various kinds of content to be displayed are prepared. Also, the sewing-machine-side display unit 41 is configured as a touch panel to allow the user to input various operation instructions.

The reception unit 42 and the transmission unit 46 are connected to the tablet terminal 10 via the wireless LAN 70. This enables bidirectional communication between the sewing machine 40 and the tablet terminal 10 via an unshown router or the like. It should be noted that the present invention is not restricted to such an arrangement employing a network such as the wireless LAN 70 or the like. For example, a communication system may be employed using Bluetooth (trademark). Also, an off-line communication system may be employed using USB memory 80 or the like, for example.

The sewing-machine-side storage unit 43 is configured as ROM (Read Only Memory), RAM (Random Access Memory), flash memory, or the like, and stores several hundred kinds of embroidery design data, for example. Also, the sewing-machine-side storage unit 43 may store additional designs (user-prepared designs) which are obtained by the user from external data. Also, the sewing-machine-side storage unit 43 is configured to allow the data stored in it, such as the embroidery design data, the information relating to the embroidery design data, and the information with respect to the embroidery frame, to be transmitted to the tablet terminal 10.

The control unit 44 controls the operation of the sewing machine 40 according to the control program. Furthermore, the control unit 44 performs a response operation according to an inquiry from the tablet terminal 10. In addition, the control unit 44 is capable of performing a control operation so as to allow the user to perform simple data editing operations such as selection, mixing, transformation, etc., on the embroidery designs using the sewing machine 40 itself with the display function and the input function of the sewing-machine-side display unit 41.

The embroidery frame identifying unit 45 identifies the kind of the embroidery frame 110 mounted on the sewing machine 40. The embroidery frame identifying unit 45 according to the present embodiment identifies the kind of the embroidery frame 110 mounted on the sewing machine 40 by way of the kind of the embroidery frame input or otherwise selected by the user via the sewing-machine-side display unit 41. It should be noted that the embroidery frame identifying method used by the embroidery frame identifying unit 45 is not restricted to such an arrangement. Also, the kind of the embroidery frame 110 mounted on the sewing machine 40 may be identified using an IC chip or a contact circuit.

The embroidery operation executing unit 47 executes an embroidery operation on an embroidery target cloth 60 mounted on the embroidery frame 110 based on the embroidery layout data received via the reception unit 42.

[Operation of the Embroidery Design Layout System]

Description will be made with reference to FIGS. 3 through 11, and FIGS. 15 and 16, regarding the operation of the embroidery design layout system according to the present embodiment. It should be noted that description will be made separately regarding the operation of the tablet terminal and the operation of the sewing machine.

[Operation of the Tablet Terminal]

Figure 15:
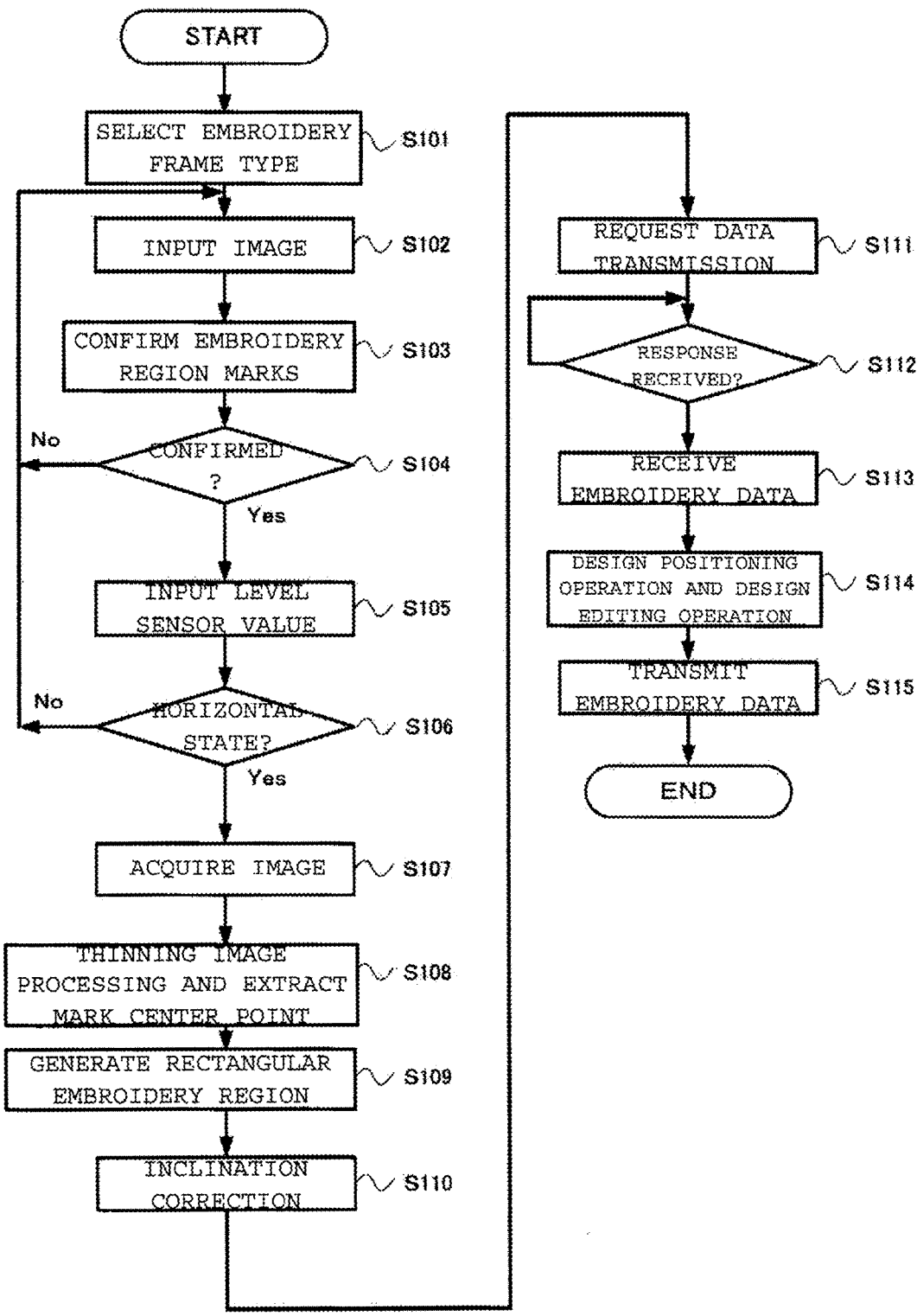
FIG. 15 is a diagram showing an electrical operation of a tablet terminal employed in the embroidery design layout system according to the second embodiment of the present invention.

First, as a preparation step, the user mounts a cloth 60 on the embroidery frame 110, and places the embroidery frame 110 in a horizontal position. As shown in FIG. 15, after the user starts up the application installed on the tablet terminal 10, the user opens a frame type selection menu. In this stage, the display unit 12 of the tablet terminal 10 displays a frame type list for the embroidery frame 110 (Step S101).

The user selects the same frame type as that of the embroidery frame 110 mounting the cloth 60 from the list. In this stage, the image acquisition unit 14 starts up, and the display unit 12 of the tablet terminal 10 displays a screen as shown in FIG. 5. Furthermore, the display unit 12 displays a real-time image as a superimposed image (Step S102). FIG. 5 shows an image including: an image of the image acquisition alignment regions positioned on four corners thereof for the embroidery region marks determined beforehand according to the embroidery frame type; and an image of a level indicator on the central portion thereof that indicates the degree of horizontality of the tablet terminal 10. When the inner circle shown as a white circle is aligned with the center of the outer circle after the user adjusts the level of the tablet 10, this indicates that the tablet terminal 10 has come to be in a horizontal state. The user adjusts the position of the tablet such that the eight embroidery region marks 114 are all positioned within the image acquisition alignment regions for the embroidery region marks, and such that the inner circle shown as a white circle configured as a level indicator is aligned with the center of the outer circle. It should be noted that an image input in a real-time manner may be analyzed so as to automatically detect whether or not the embroidery region marks 114 are each positioned in a corresponding narrow region (shaded region in FIGS. 6 and 7). Such an arrangement may notify the user of the detection result by means of a buzzer or the like.

The user holds the image acquisition unit 14 configured as the tablet terminal 10 above the embroidery frame 110 over which the embroidery target cloth 60 has been stretched. Judgement is made, by means of image processing, regarding whether or not the embroidery region marks 114 are each positioned within the corresponding one of the embroidery region mark alignment regions provided to the four corners of the display unit 12 of the tablet terminal 10 (Step S103). When judgement has been made that the embroidery region marks 114 are not each positioned within the corresponding mark alignment region for the embroidery region marks 114 ("NO" in Step S104), the flow returns to Step S102, and image acquisition is performed again.

When judgement has been made that each embroidery region mark 114 is positioned within the corresponding embroidery region mark alignment region ("YES" in Step S104), the flow proceeds to Step S105 in which the sensor value of the level sensor is read out and judgment is made whether or not the tablet terminal 10 is in a horizontal state (Step S106). When judgment has been made that the tablet terminal 10 is not in a horizontal state ("NO" in Step S106), the flow returns to Step S102, and the image acquisition is performed again. When judgment has been made that the tablet terminal 10 is in a horizontal state ("YES" in Step S106), judgement is made that the image acquisition condition has been satisfied. In this case, the flow proceeds to Step S107 in which the image displayed in this stage is acquired and stored in the memory as the image data.

The embroidery region marks 114 printed on the inner frame 111 of the embroidery frame 110 each have a given thickness and a given length. Accordingly, as shown in FIG. 8, thinning image processing is performed such that each embroidery region mark is transformed into a line (Step S118). Subsequently, the coordinate position of an intermediate point that divides the length into two halves is acquired for each of the eight lines. Furthermore, as shown in FIG. 9, lines are defined such that they each pass through a pair of opposing intermediate points. That is to say, such lines are defined based on the coordinate positions of the points a through h.

Four equations are derived based on the coordinate positions of the points a through h, such that they represent the four lines, i.e., the line a-d, the line h-e, the line b-g, and the line c-f. Next, the equations are solved so as to calculate the intersection for each pair of lines that are orthogonal to each other, i.e., the intersections between the line a-d and the line b-g, between the line a-d and the line c-f, between the line c-f and the line h-e, and between the line h-e and the line b-g. With the intersection between the line a-d and the line b-g as k, with the intersection between the line a-d and the line c-f as 1, with the intersection between the line c-f and the line h-e as m, and with the intersection between the line h-e and the line b-g as n, lines are defined such that they pass through the intersections as shown in FIG. 10, thereby defining the embroidery region having a rectangular shape (Step S109).

FIG. 10 shows an example case in which the tablet terminal 10 is held by the user in an inclined manner. Accordingly, the acquired image has a corresponding inclination, leading to the image of the embroidery region having the same inclination. In order to address such an issue, the inclination is corrected, i.e., rotation correction is performed such that the acquired image is aligned with the center axis of the tablet terminal, thereby providing the screen display as shown in FIG. 11 (Step S110).

By performing the operation in Step S110, such an arrangement is capable of acquiring the information with respect to the embroidery region based on the acquired image. The embroidery design information acquisition unit 22 of the tablet terminal 10 requests the sewing machine 40 to transmit the embroidery data (Step S111), and waits for a response (Step S112).

When the embroidery design information acquisition unit 22 receives the embroidery data from the sewing machine 40 (Step S113), the display control unit 23 generates drawing data of a design having a shape based on the embroidery data received by the display control unit 23, and displays the drawing data within the embroidery region. The operating unit 24 receives operating instruction information from the user. The embroidery layout data editing unit 25 performs a data editing operation such as positioning or the like based on the information thus received (Step S114). The embroidery data thus edited is transmitted as a response to the sewing machine 40 via the transmission unit 26. In this stage, a series of operations ends on the tablet terminal 10 side.

[Operation of the Sewing Machine]

Figure 16:
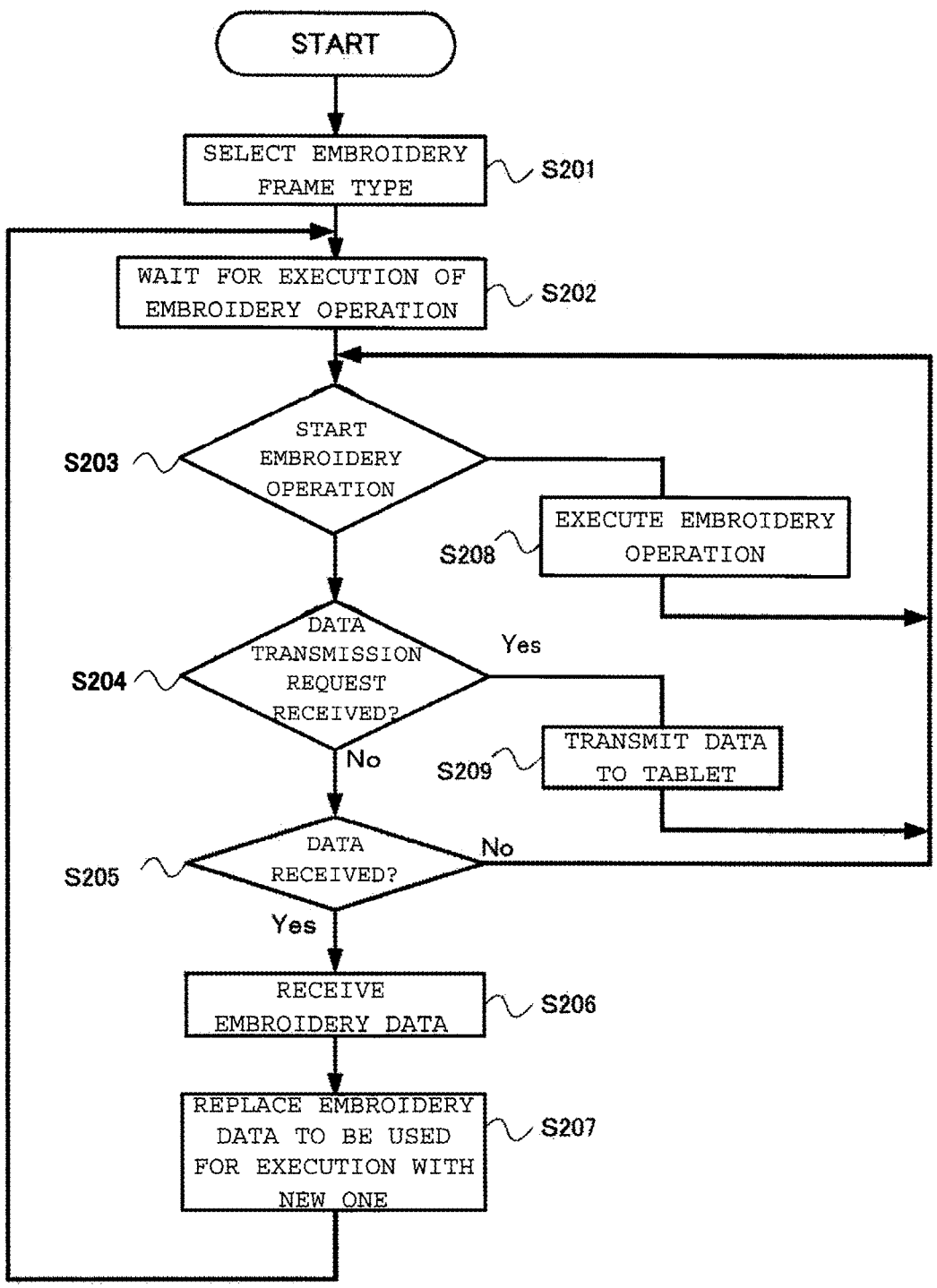
FIG. 16 is a diagram showing an electrical operation of a sewing machine of the embroidery design layout system according to the second embodiment of the present invention.

As shown in FIG. 16, when the user selects a design to be used for embroidery from the design list, the embroidery data is read out and stored in the memory (Step S201). Subsequently, the sewing machine 40 stands by and waits for execution of the embroidery operation (Step S202). While standing by, the sewing machine 40 monitors whether or not a tactile switch has been pressed and whether or not communication has occurred.

When the tactile switch is pressed ("Start" in Step S203), the sewing machine 40 executes the embroidery operation (Step S208).

When the sewing machine 40 receives an embroidery data transmission request from the tablet terminal 10 ("YES" in Step S204), the embroidery data stored in the memory is transmitted to the tablet terminal 10, and the sewing machine 40 waits for a subsequent instruction (Step S209).

When the tablet terminal 10 transmits the edited embroidery data to the sewing machine 40 ("YES" in Step S205), the sewing machine 40 receives the embroidery data thus transmitted (Step S206). Subsequently, the sewing machine 40 discards the embroidery data stored in its memory, i.e., replaces it with the embroidery data thus received in Step S206 (Step S207).

That is to say, the sewing machine 40 is switched to a state in which it stands by and waits for execution of the embroidery operation with the embroidery data obtained by performing the positioning operation by means of the tablet terminal 10. When the user presses a start button provided to the sewing machine 40 after the user mounts the embroidery frame 110 to which the embroidery target cloth 60 has been attached on the sewing machine 40 as described above, the sewing machine 40 receives a start instruction in Step S203, and executes the embroidery operation (Step S208). In this stage, the sewing machine 40 performs a sewing operation so as to correctly embroider an embroidery design on the embroidery target cloth 60 at the same position as that displayed on the tablet terminal 10.

[Effects of the Present Embodiment]

As described above, with the present embodiment, the actual embroidery region is represented by known values. This allows the image magnification factor to be derived. With such an arrangement, the positioning operation for an embroidery design drawn on the screen is reflected in the control operation of the actual embroidery frame It should be noted that the operation of the embroidery region detection apparatus or the embroidery design layout system may be recorded on a computer-system-readable or computer-readable recording medium in the form of a program. Also, such a program thus recorded may be read out and executed by the embroidery region detection apparatus or the embroidery design layout system, thereby providing the embroidery region detection apparatus or the embroidery design layout system according to the present invention. Examples of such a computer system or computer as used here include an operating system and a hardware component such as peripheral devices or the like.

Also, the "computer system" or "computer" encompasses website providing environments (or display environments) that employ the WWW (World Wide Web) system. Also, the aforementioned program may be transmitted to other computer systems or computers from a given computer system or computer that stores this program in its storage apparatus or the like via a transmission medium or otherwise transmission waves in the transmission medium. The "transmission medium" as used here to transmit a program represents a medium having a function of transmitting information, examples of which include networks (communication networks) such as the Internet and communication lines (communication wires) such as phone lines, etc.

Also, the aforementioned program may be configured to provide a part of the aforementioned function. Also, the aforementioned program may be configured as a so-called differential file (differential program), which is to be combined with a different program stored beforehand in a computer system or computer in order to provide the aforementioned function.

Detailed description has been made with reference to the drawings regarding the embodiment according to the present invention. However, such a specific configuration is not restricted to the embodiment. Rather, various kinds of changes in design or the like may be made without departing from the scope of the present invention.

REFERENCE SIGNS LIST

10; tablet terminal
11; embroidery frame information acquisition unit
12; display unit
13; operation instructing unit
14; image acquisition unit
15; acquired image analyzing unit
16; embroidery region determination unit
17; gravity direction detection unit
18; correction unit
19; control unit
20; tablet terminal
21; control unit
22; embroidery design information acquisition unit
23; display control unit
24; operating unit
25; embroidery layout data editing unit
26; transmission unit
40; sewing machine
41; sewing-machine-side display unit
42; reception unit
43; sewing-machine-side storage unit
44; control unit
45; embroidery frame identifying unit 46; transmission unit
47; embroidery operation executing unit
110; embroidery frame
111; inner frame
112; outer frame
113; center axis
114; embroidery region mark.

What is claimed is:

1. An embroidery region detection apparatus comprising:
an embroidery frame information acquisition unit that acquires information with respect to an embroidery frame and information with respect to a mark alignment region to be displayed on a display unit for guiding a plurality of marks provided to the embroidery frame for defining an embroidery region within the embroidery frame;
an image acquisition unit that acquires an image of the embroidery frame when the plurality of marks displayed on the display unit are all positioned within the mark alignment region;
an acquired image analyzing unit that performs image analysis based on the information with respect to the embroidery frame acquired by the embroidery frame information acquisition unit and corresponding information with respect to the plurality of marks displayed in the image acquired by the image acquisition unit;
an embroidery region determination unit that determines the embroidery region within the embroidery frame based on an analysis result obtained by the acquired image analyzing unit; and
a gravity direction detection unit that detects a gravity direction,
wherein the display unit displays an image acquisition orientation guidance display for guiding a position at which an image acquisition optical axis of the image acquisition unit aligns with the gravity direction based on a detection result obtained by the gravity direction detection unit.

2. The embroidery region detection apparatus according to claim 1, comprising an operation instructing unit that calls attention to inputting a positioning instruction for the embroidery frame such that the plurality of marks displayed on the display unit are all positioned within the mark alignment region.

3. The embroidery region detection apparatus according to claim 2, wherein the operation instructing unit provides at least one from among a guidance display and an audio guidance.

4. The embroidery region detection apparatus according to claim 1, wherein, when the plurality of marks displayed on the display unit are all positioned within the mark alignment region and when judgment has been made based on the detection result obtained by the gravity direction detection unit that the image acquisition optical axis aligns with the gravity direction, the image acquisition unit automatically performs image acquisition.

5. The embroidery region detection apparatus according to claim 1, comprising a correction unit configured such that, when there is an inclination between the display unit and the embroidery region in the image acquired by the image acquisition unit, the inclination is corrected.

6. The embroidery region detection apparatus according to claim 1, wherein the plurality of marks are configured so as to differ in terms of at least one property from among color and shape according to the plurality of embroidery regions to be defined in the embroidery frame.

7. The embroidery region detection apparatus according to claim 1, wherein the acquired image analyzing unit performs thinning image processing on the image of the plurality of marks thus acquired,
and wherein the embroidery region determination unit determines the embroidery region based on the plurality of marks thus subjected to the thinning image processing.

8. An embroidery region detection method employed by an embroidery region detection apparatus comprising an embroidery frame information acquisition unit, a display unit, an image acquisition unit, an acquired image analyzing unit, an embroidery region determination unit, and a gravity direction detection unit that detects a gravity direction, the embroidery region detection method comprising:
acquiring, by the embroidery frame information acquisition unit, information with respect to an embroidery frame and information with respect to a mark alignment region displayed on a display unit for guiding a plurality of marks provided to the embroidery frame for defining an embroidery region within the embroidery frame;
acquiring, by the image acquisition unit, an image of the embroidery frame when the plurality of marks displayed on the display unit are all positioned within the mark alignment region;
performing image analysis by the acquired image analyzing unit based on the information with respect to the embroidery frame acquired by the embroidery frame information acquisition unit and corresponding information with respect to the plurality of marks displayed in the image acquired by the image acquisition unit; and
determining, by the embroidery region determination unit, the embroidery region within the embroidery frame based on an analysis result obtained by the acquired image analyzing unit,
wherein the display unit displays an image acquisition orientation guidance display for guiding a position at which an image acquisition optical axis of the image acquisition unit aligns with the gravity direction based on a detection result obtained by the gravity direction detection unit.

9. A non-transitory computer-readable recording medium for storing a program that instructs an embroidery region detection apparatus comprising an embroidery frame information acquisition unit, an image acquisition unit, a display unit, an acquired image analyzing unit, an embroidery region determination unit, and a gravity direction detection unit that detects a gravity direction to execute an embroidery region detection method, wherein the embroidery region detection method comprising:
acquiring, by the embroidery frame information acquisition unit, information with respect to an embroidery frame and information with respect to a mark alignment region displayed on a display unit for guiding a plurality of marks provided to the embroidery frame for defining an embroidery region within the embroidery frame;
acquiring, by the image acquisition unit, an image of the embroidery frame when the plurality of marks displayed on the display unit are all positioned within the mark alignment region;
performing image analysis by the acquired image analyzing unit based on the information with respect to the embroidery frame acquired by the embroidery frame information acquisition unit and corresponding information with respect to the plurality of marks displayed in the image acquired by the image acquisition unit; and determining, by the embroidery region determination unit, the embroidery region within the embroidery frame based on an analysis result obtained by the acquired image analyzing unit, wherein the display unit displays an image acquisition orientation guidance display for guiding a position at which an image acquisition optical axis of the image acquisition unit aligns with the gravity direction based on a detection result obtained by the gravity direction detection unit.

10. An embroidery design layout system comprising an embroidery region detection apparatus and a sewing machine, wherein the embroidery region detection apparatus comprises:

an embroidery frame information acquisition unit that acquires information with respect to an embroidery frame and information with respect to a mark alignment region to be displayed on a display unit for guiding a plurality of marks provided to the embroidery frame for defining an embroidery region within the embroidery frame;

an image acquisition unit that acquires an image of the embroidery frame when the plurality of marks displayed on the display unit are all positioned within the mark alignment region;

an acquired image analyzing unit that performs image analysis based on the information with respect to the embroidery frame acquired by the embroidery frame information acquisition unit and corresponding information with respect to the plurality of marks displayed in the image acquired by the image acquisition unit;

an embroidery region determination unit that determines the embroidery region within the embroidery frame based on an analysis result obtained by the acquired image analyzing unit;

an embroidery design information acquisition unit that acquires, from the sewing machine, information with respect to an embroidery design to be used for embroidery;

a gravity direction detection unit that detects a gravity direction;

a display control unit that instructs the display unit to display the embroidery design acquired by the embroidery design information acquisition unit and an image of the embroidery frame acquired by the image acquisition unit in a superimposed manner;

an operating unit that receives an operating instruction from a user;

an embroidery layout data editing unit that performs coordinate conversion based on a position and an orientation of the embroidery design with respect to the embroidery region within the embroidery frame according to the operating instruction input via the operating unit, so as to edit the embroidery layout data; and a transmission unit that transmits the embroidery layout data thus edited to the sewing machine, wherein the sewing machine comprises:

a reception unit that receives the embroidery layout data thus edited; and an embroidery executing unit that executes an embroidery operation for an embroidery target cloth mounted on the embroidery frame based on the embroidery layout data thus received; and wherein the display unit displays an image acquisition orientation guidance display for guiding a position at which an image acquisition optical axis of the image acquisition unit aligns with the gravity direction based on a detection result obtained by the gravity direction detection unit.

* * * * *